United States Patent Office
3,006,424
Patented Oct. 31, 1961

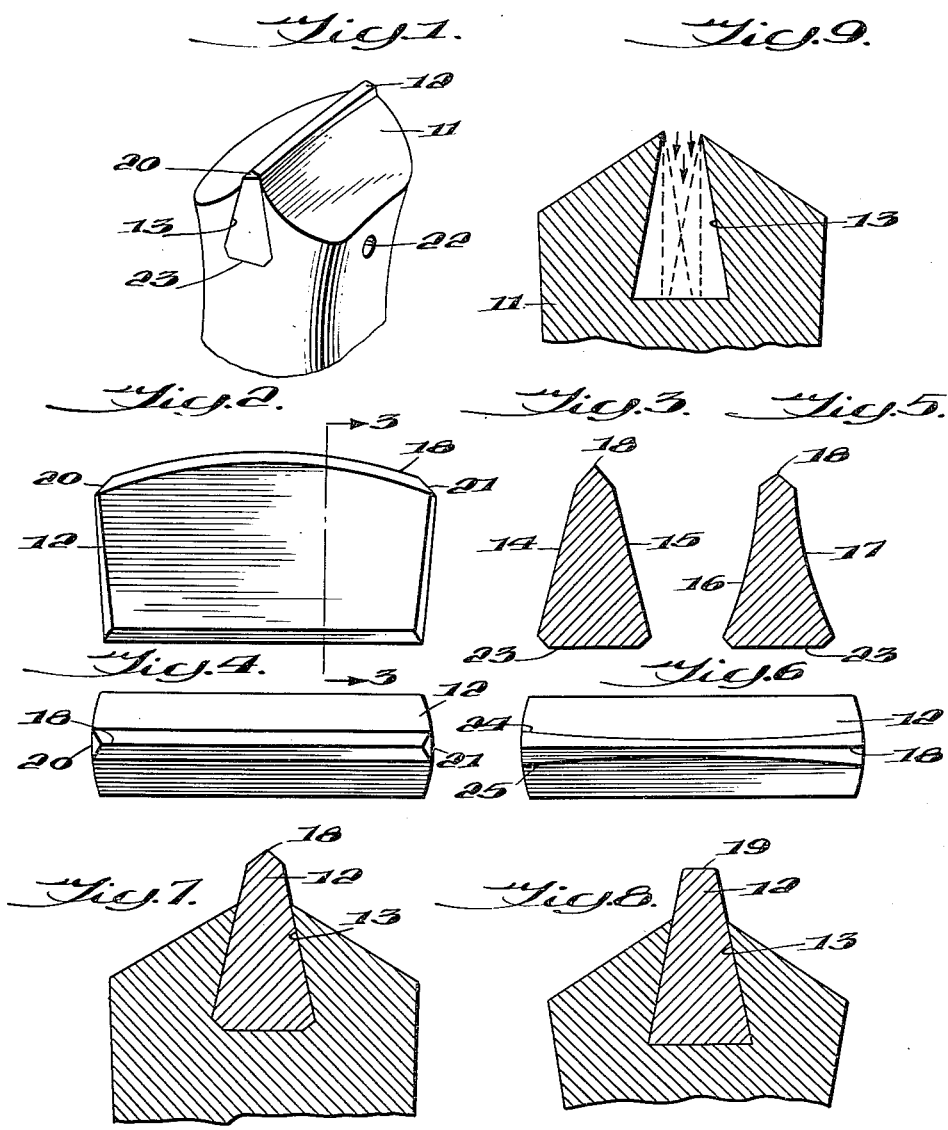

3,006,424
ROCK DRILL BITS AND CUTTING INSERTS THEREFOR
Curt Vilhelm Dahlin, Sandviken, and Kaljo Käärik, Stockholm, Sweden, assignors to Sandvikens Jernverks Aktiebolag, Sandviken, Sweden, a corporation of Sweden
Filed Apr. 20, 1959, Ser. No. 807,573
Claims priority, application Sweden May 23, 1958
2 Claims. (Cl. 175—410)

This invention relates to rock drill bits adapted for percussive drilling and embraces drill bits having hard metal cutting inserts, the inserts themselves and the method of forming the drill bits. The drill bits may be integral with drill rods or detachable therefrom.

The cutting inserts of drill bits in use up to the present have to be reground from time to time not only to maintain cutting speed but also to prevent undue stresses on and breakage of the cutting inserts and drill rods. With certain hard species of rock principally the cutting edges of the cutting inserts are worn down while with other species of rock such as quartzite principally the corners and end surfaces of the cutting inserts are worn. These two types of wearing may be referred to as "height wearing" and "diameter wearing." With diameter wearing there is a tendency, in drilling, to produce a so-called counter-tapering which causes a wedging action between the drill bit and the drill hole and creates great stresses and frequent breakage of the cutting inserts.

Repeated regrinding of the cutting inserts is quite troublesome and expensive because not only the grinding is involved but also the loss of time for changing bits and the cost of transporting the drills or drill bits from the mine to a grinding station and back. In drilling deep holes there is a considerable loss of drilling time.

The present invention eliminates or at least greatly reduces the trouble and expense incident to regrinding by providing drill bits with one or more cutting inserts which may be used for a great number of drill holes or for very long drill holes without regrinding. The cutting inserts of the present invention are also capable of withstanding the great stresses encountered in percussive drilling without breaking.

The drill bits and cutting inserts of the present invention are characterized by the fact that the side surfaces of the inserts converge toward each other in the direction of drilling, the rate of convergence being such that the shortest distance between the side surfaces adjacent the cutting edge of the insert is not more than half of the distance between said surfaces adjacent the base of the insert. These dimensions apply to all inserts of conventional heights from base to edge e.g. to inserts in which the height is from about 1 to about 4 times the average thickness.

The side surfaces of the insert may be plane or slightly curved i.e. concave or convex. The minimum thickness of the inserts, i.e. the shortest distance between the side surfaces adjacent the cutting edge preferably is within the range from 2 to 6 mm. preferably from 3 to 5 mm., e.g. 4 mm.

The drill bit may, as indicated above, contain one or more cutting inserts in any of the conventional arrangements e.g. a single insert or four inserts arranged in the form of a cross.

By hard metal cutting inserts I mean the well known sintered products comprising one or more hard materials such as tungsten carbide and one or more bonding materials such as cobalt, nickel and/or iron. Sintered ceramic products such as alumina with or without a bonding agent also are included. The compositions and methods of manufacture of cutting inserts for rock drill bits are well known and need not be disclosed herein since the present invention is concerned only with the shape and dimensions of the cutting inserts.

The invention will be further described in connection with the accompanying drawings which show several embodiments.

Referring to the drawings:

FIG. 1 is a perspective view of the cutting end portion of a drill bit having a single cutting insert with converging plane side surfaces;

FIG. 2 is a side elevational view of the cutting insert shown in FIG. 1;

FIG. 3 is a section on the line 3—3 of FIG. 2;

FIG. 4 is a plan view of the insert shown in FIGS. 1, 2 and 3, looking toward the edge thereof;

FIG. 5 is a section, similar to that of FIG. 3 of a modified shape of cutting insert having side surfaces which are curved (concave) from edge to base;

FIG. 6 is a plan view looking toward the cutting edge of an insert the side surfaces of which are curved (concave) from end to end of the insert;

FIGS. 7 and 8 are longitudinal sections showing two embodiments of drill bits, and FIG. 9 is a longitudinal section of a drill bit schematically showing how the groove for the cutting insert is formed.

Referring to FIGURE 1, 11 is the drill bit which may be either integral with the drill rod (not shown) or adapted to be attached thereto as is well known. 12 is the cutting insert which is secured in the groove 13 by brazing, welding or otherwise as is well known. The drawings illustrate a single cutting insert in each drill bit but as stated above the invention embraces the mounting of any number and arrangement of inserts in each drill bit.

As clearly appears in FIGS. 1–4 the side surfaces 14 and 15 of the insert are plane and converge toward each other from lines at or near the base 23 of the insert to lines at or adjacent to the cutting edge 18 i.e. in the drilling direction. In the modification shown in FIG. 5 the side surfaces 16 and 17 also converge in the drilling direction but instead of being plane are curved inwardly toward each other, the curvature extending from the base to the cutting edge while in the modification shown in FIG. 6 the side surfaces 24 and 25 also converge toward each other and are also curved inwardly toward each other from end to end of the insert. The embodiment of FIG. 6 may be used both with side surface forms of FIG. 3 and FIG. 5.

As stated above the side surfaces may have other curvatures i.e. they may be concave both from base to edge and from end to end or they may be slightly convex either from base to edge or from end to end or both or combinations of concave and convex curvature may be employed so long as the side surfaces are converging toward each other in the drilling direction.

As appears in FIGS. 1–8 the inserts may be provided with a cutting edge 18 or with a flat surface 19 as shown. Other edge shapes may be used but it is essential that the part of the insert adjacent to the cutting edge surface shall be relatively thin i.e. from 2 to 6 mm. In other words the boundaries of the side surfaces, whether plane or curved, adjacent to the edge surface or surfaces of the insert should be within the range from 2 to 6 mm. from each other. In the embodiments illustrated in FIGS. 1–5 and 7–8, the different portions of the inserts such as the portion adjacent to the cutting edge and the portion adjacent to the base are of uniform thickness whereas in the modification illustrated in FIG. 6 the insert is thinner at the middle than at the ends. Convex curvature of the side surfaces, the curvature extending from end to end, would of course give a portion adjacent to the edge portion which is thicker adjacent the middle than adjacent to the ends of the insert. When, due to concave or convex curvature the thickness of the insert adjacent to the edge portion varies throughout the length thereof the shortest distance between the side surfaces must be within the specified range from 2 to 6 mm. and the distance at other points may fall outside of this range and may be for example 7 mm.

In drilling certain species of rock it has been found to be advantageous to have the side surfaces of the cutting insert protrude more or less from the groove 13 as shown in FIGS. 1, 7 and 8. We have found that this distance to which the side surfaces protrude should be about the same as the thinnest portion of the insert adjacent to the cutting edge portion thereof i.e. within the range from 2 to 6 mm. Moreover as shown in FIG. 1 it has been found to be advantageous in some instances to have the cutting insert protrude from the groove 13 more adjacent the ends thereof than in the middle portion thereof, that is, the side surfaces of the cutting insert protrude from the groove 13 to a greater distance at points more remote from the axis of the drill bit than at points nearer to said axis. The shortest distance between the side surfaces should be not more than five-eighths and preferably not more than one-half of the greatest distance between the side surfaces. In many instances the shortest distance between the side surfaces is within the range from one-third to one-half of the greatest distance between the side surfaces.

In making the drill bits it is necessary to provide the groove 13 which is wider at the bottom than at the top so as to conform to the shape of the inserts which, as stated have upwardly converging side surfaces. This is done, in accordance with the invention by milling. The milling cutter may have a width equal to or less than the minimum width of the groove 13 and the groove is then formed by making one or more cuts in each of the directions indicated by the three arrows and the corresponding pairs of parallel broken lines in FIG. 9. If the milling cutter makes a cut equal to the width of the groove 13 at its narrowest point then a single cut is made in each of the three directions indicated by the arrows. If the milling cutter makes a cut which is narrower than the minimum width of the grove then a plurality of cuts may be made in each direction in order to remove the material between each pair of parallel broken lines.

As shown in FIGS. 1, 2 and 4 the corners 20 and 21 of the cutting inserts which are especially vulnerable to being broken or worn away rapidly are bevelled.

As appears in FIG. 1 an orifice 22 is provided which leads to a flushing channel in the body of the drill bit, this being a well known expedient.

An example of a cutting insert in accordance with the invention is one in which the height from the base 23 to the cutting edge 18 is about 17 mm., the maximum thickness at the base is 10 mm., and the minimum thickness between the converging side surfaces adjacent to the cutting edge is 4 mm. These dimensions are suitable whether the side surfaces are plane or curved.

It has been found that a drill bit in accordance with the present invention as described above avoids the troublesome and expensive regrindings involved in the use of the drill bits of the prior art. With the drill bits of the present invention it is possible to drill a great number of holes and/or very deep holes without regrinding and without reducing the drilling speed. It has been found that the gradual wearing away of the cutting inserts does not affect the drilling speed and that the cutting inserts satisfactorily resist the stresses involved in the precussive drilling of the hardest species of rock. Surprisingly it has been found that the troublesome countertaper phenomenon referred to above does not occur in the use of the drill bits of the present invention.

The invention is not limited to the specific embodiments described herein but is defined by the scope of the appended claims.

We claim:

1. A rock drill bit adapted for percussive drilling comprising a drill bit body and a cutting insert fastened in a groove in said body by brazing, said cutting insert consisting of sintered metallic material consisting essentially of tungsten carbide and a bonding metal selected from the group consisting of cobalt, nickel and iron and having a cutting edge surface, a plane base surface opposite to said cutting edge surface, plane side surfaces which converge toward each other from said base surface to said cutting edge surface and end surfaces, said edge surface being convex with respect to said base surface and being wider adjacent the ends thereof than adjacent the middle thereof, said side surfaces protruding from said groove a distance of from 2 to 6 millimeters and the shortest distance between said side surfaces being from 3 to 5 millimeters while the distance between said side surfaces adjacent to said base surface is from 2 to 3 times said shortest distance between said side surfaces.

2. A rock drill bit as defined in claim 1 in which said insert protrudes farther from said groove adjacent the ends thereof than adjacent the middle thereof.

References Cited in the file of this patent

UNITED STATES PATENTS

| | | |
|---|---|---|
| 993,972 | English | May 30, 1911 |
| 1,094,063 | Forbes | Apr. 21, 1914 |
| 1,428,415 | Brossoit | Sept. 5, 1922 |
| 2,529,788 | Signell | Nov. 14, 1950 |
| 2,565,333 | Weidman | Aug. 21, 1951 |
| 2,628,821 | Alexander et al. | Feb. 17, 1953 |
| 2,689,108 | Haglund | Sept. 14, 1954 |
| 2,735,656 | Hoglund et. al. | Feb. 21, 1956 |

FOREIGN PATENTS

| | | |
|---|---|---|
| 203,039 | Great Britain | Aug. 30, 1923 |